No. 860,253. PATENTED JULY 16, 1907.
D. E. SCRAFFORD.
METER.
APPLICATION FILED AUG. 27, 1904.
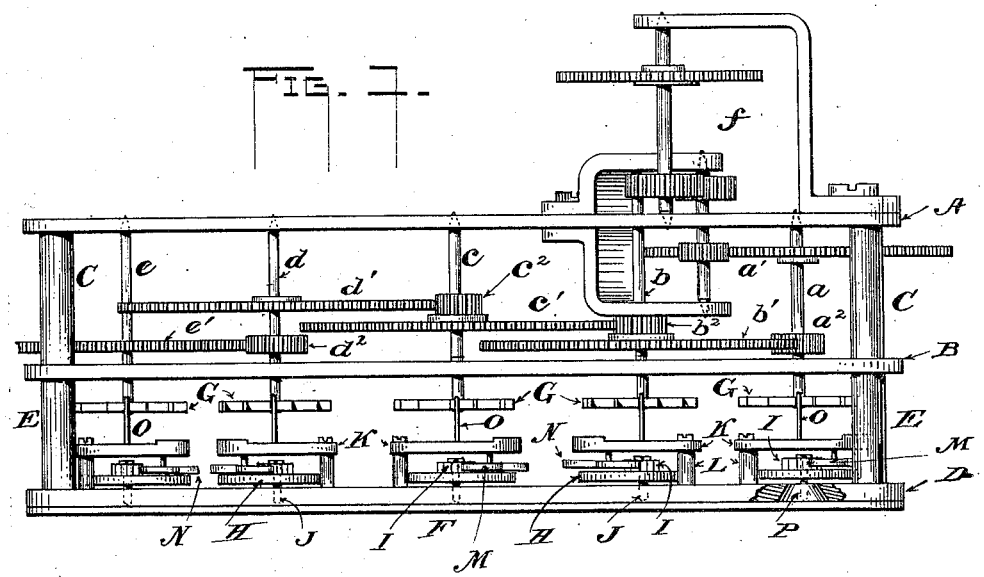
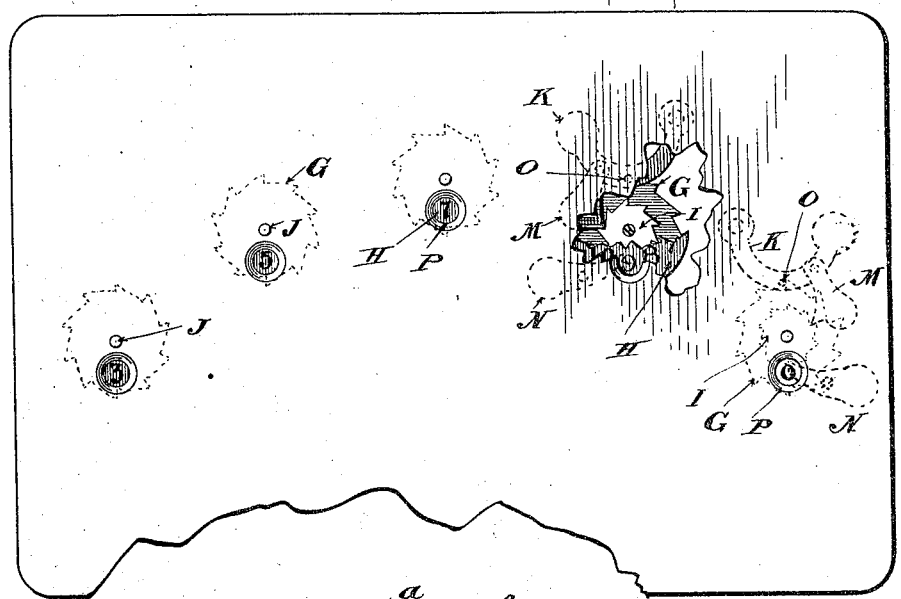
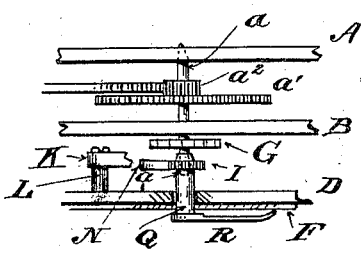
Witnesses:
Inventor:
Daniel E. Scrafford
By L. M. Thurlow,
Atty.

UNITED STATES PATENT OFFICE.

DANIEL E. SCRAFFORD, OF PEORIA, ILLINOIS.

METER.

No. 860,253.     Specification of Letters Patent.     Patented July 16, 1907.

Application filed August 27, 1904. Serial No. 222,525.

*To all whom it may concern:*

Be it known that I, DANIEL E. SCRAFFORD, a citizen of the United States, residing at Peoria, in the county of Peoria and State of Illinois, have invented certain new and useful Improvements in Meters; and I do hereby declare that the following is a full, clear, and exact description of the invention, which will enable others skilled in the art to which it appertains to make and use the same.

This invention pertains to meters for registering the amount of gas or electricity used but may be adapted for other uses also where a meter can be employed.

The object of the present invention is to provide a meter which will register in a step-by-step manner, that is, that its indicator fingers or dials, whichever may be employed, shall move from one figure to another and be found only at the figures instead of between thereby making the reading of the meter a positive one.

A further object of the invention is to provide an attachment for meters as ordinarily constructed so that said meter may be changed from the common continuously moving form to the step-by-step form so that the readings taken therefrom will be correct as to the amount of gas or electricity used up to the time of reading.

In the appended drawing forming a part of this application, Figure 1 represents a top or edge view of the meter mechanism as removed from the case. Fig. 2 is a face view of the same showing its dial and parts broken away to show arrangement of mechanism behind. Fig. 3 is a view of a slightly modified form of certain parts of my meter construction.

By the aid of the drawing the common form of meter will be described after which my attachment will be explained to render the invention more clearly understood. As ordinarily constructed a meter consists of the plates A and B held apart by such means as the posts C C and between the said plates are carried the usual arbors $a$, $b$, $c$, $d$, $e$, provided with the gears and pinions $a'$, $a^2$; $b'$, $b^2$; $c'$, $c^2$; $d'$, $d^2$, and $e$ respectively for each said arbor as shown, while at $f$ suitable gearing connecting with the operating mechanism imparts the desired movement to the series of gears and pinions described for registering purposes. The dial is usually carried on the outer face of the plate B and the ends of arbors $a$, $b$, $c$, $d$, $e$ carry indicator fingers which, however, are not shown. I attach no importance to the mechanism just described since it does not enter into my invention except to carry out certain operations necessary therein. My invention now, which may be termed an attachment since it can be applied to any meter now made, consists in providing a third plate D for the meter separated from the plate B by means of posts E, and the dial F in lieu of being carried on the plate B as hereinbefore mentioned is carried on the outer face of said plate D when the usual indicator fingers are employed, said dial being provided with the usual printed numerals from 1 to 0 but not shown herein since it is too well understood to require further attention.

The ends of the arbors $a$, $b$, $c$, $d$, $e$, where they project through the plate B are deprived of the usual indicator fingers and a ratchet wheel G is affixed to each arbor in lieu of said fingers. At the back of the plate D directly opposite each arbor is a dial H provided as shown in Fig. 2 with the usual numerals, ten in number. Adjacent to the dial is a ratchet wheel I designed to move said dial one of the teeth of said wheel being in line with one of the numerals. A screw J or other device is employed on which the dial and ratchet wheel may revolve, said screw being held in the plate D. Also on the back of the plate just indicated is a weighted lever K for each of the ratchet wheels I the same being carried pivotally by the posts L, there being one of said levers above each wheel as shown. Depending from each of the levers is a gravity pawl M adapted for engagement with the ratchet wheel I. Pivoted to the plate D below each of the latter is a pawl N also adapted to engage the said ratchet wheels the latter pawl being designed to prevent backward movement of the wheel when moved ahead by the upper pawl M mentioned. Secured to the levers K are horizontal pins O extending toward and resting upon the ratchet wheels G as illustrated in Fig. 1.

In Fig. 2 the dial F is omitted since it is not used with the revolving dials H, there being windows P in the plate D through which the figures on the dials may be read. But in Fig. 3 a modified form of device is shown in which a sleeve Q carrying the ratchet wheel I is employed, said sleeve being placed upon the arbor $a$ but only frictionally held thereby so that the indicator finger R will not fall of its own weight, the friction being sufficient to prevent such an occurrence. The lever K and the pawls described hereinbefore are employed in this form in the same way and serve to turn the finger R in the same manner as the dials are in the other form. By this means the dial F may be used with the usual numerals thereon, the fingers R moving from figure to figure to bring about the positive reading as before.

In operation operating mechanism imparts movement to the various arbors through the gears and pinions turning the ratchet wheels G in the same manner as the indicator fingers have been moved in the old forms of meter. Now, since there are ten teeth to each ratchet wheel the levers K will be moved as many times during one revolution of said wheels by means of the pins O described which rest upon the wheels and follow the teeth up and down. That is to say, the pin rises on each tooth and falls to the next again rising to fall again and this movement in imparting a like movement to the pawls M will turn the ratchet wheel I a tenth of a revolution at each fall of said lever K thereby moving the dial H one number in front of the window P of the plate D. Or in Fig. 3 the finger R will receive the same movement upon the dial F as will be understood. It is to be observed that since the arbors a, b, etc turn in opposite directions the ratchet wheels G must be reversed in position on every second arbor so as to impart movement to the said levers K. It is to be seen also that the said levers are reversed in position at each dial so that said dials will move in the same direction as the arbors opposite them. The interval between each fall of the lever K corresponds exactly to the travel of an indicator finger in the old form of meter, from one figure to another the conditions be equal, of course, in each case. The mechanism between the plates A and B moves steadily on while the ratchet wheels G serve to convert that continuous motion to a step-by-step one.

The advantage of such a device in furnishing a positive reading is at once evident and the fact that any meter now in use can be provided with this attachment for gaining this advantage will not be lost sight of.

I need not necessarily confine myself to the construction shown and described since equivalent means could be devised by a person familiar with devices of this nature.

Evidently any other form of meter could be fitted with my attachment and the desired result would be attained the object being to convert the continuous movement of any meter into a step-by-step movement.

It will be understood, of course, that the first dial on the right as shown in the drawing moves an entire revolution while the one adjoining moves but a tenth of a revolution. In other words said first dial receives ten revolutions to one of the second. The same is true throughout the balance of the dials this being true of all meters. But in this instance whether the indicator R or the dial H is employed the reading can always be taken it being merely necessary to put down the figures indicated.

The pawls M and N as also the levers K may be provided with springs to keep them in engagement with their ratchet wheels but gravity is found to be sufficient. In reality the pawl M and the lever K is as one member and may be considered as a pawl of a compound form.

1. A meter comprising a train of gear wheels, a ratchet wheel carried on the shaft of each of said gear wheels, a numeral carrying dial independent of and opposite each ratchet wheel and adapted for intermittent movement and means for imparting said intermittent movement to the dials through the ratchets.

2. In a meter, the combination with a gear train, the shafts of which rotate constantly at different speeds, of a set of indicating dials, and means whereby said shafts impart intermittent rotary movement to said dials respectively.

3. The combination with a set of independently revoluble indicating dials, of a corresponding set of shafts, gearing rotating said shafts constantly at different speeds, and means whereby each shaft imparts intermittent rotary movement to the corresponding disk, substantially as set forth.

4. The combination with a gear train having its shafts constantly rotated at different predetermined speeds, of a set of revolubly mounted indicating dials, a corresponding set of dial rotating weights, and means whereby each weight is slowly raised and suddenly released by the constant rotation of one of said shafts.

5. The combination with a set of shafts, of gears connecting the shafts and constantly rotating each at one tenth the rate of the preceding shaft of the set, a corresponding set of independently revoluble indicating dials, weights arranged to impart rotary movement to the dials respectively, as the former descend, and means whereby each shaft of the set slowly raises and suddenly released the corresponding weight in rotating through a predetermined angular distance.

6. A meter comprising a train of gearing having an unremitting motion, a notched wheel for each gear, a series of numeral carrying dials independently mounted and adapted for a stop and start motion, and a trip mechanism for each dial, each operated by one of the notched wheels for moving its corresponding dial one step to expose a succeeding numeral.

7. In a meter the combination of the gearing and arbors carrying the same, a toothed wheel on the end of each of the latter, a registering dial for each arbor but entirely independent thereof, a toothed wheel for each dial, a pawl for operating the wheel and the dial, and means between the wheel on the arbor and the said pawl for imparting movement to said pawl at each passage of a tooth of said arbor wheel beyond a certain point for the purposes indicated.

8. In a meter the combination of the driving means thereof and the arbors therefor usually provided with constantly rotating hands or indicators, a ratchet wheel on each arbor in place of said indicators, a dial opposite each arbor but independent thereof, a ratchet wheel adjacent to the said dial for moving the latter, and means between the arbor wheel and the dial wheel to be raised and dropped by each tooth of said arbor wheel in the revolution of the latter for raising and dropping said means to impart a step-by-step movement to the dial.

9. In a meter, a series of continuously driven arbors, a ratchet wheel for each of said arbors, a registering dial opposite the end of each said arbor but independent thereof, and means between the ratchet wheel and the dial for imparting a step-by-step movement to said dial, said means receiving movement from said ratchet wheel and dropped therefrom as the tooth passes beneath it for the purposes described.

10. In a meter a series of continuously driven arbors, a ratchet wheel for each said arbor, a registering dial opposite the end of each arbor but independent thereof, said dial being mounted to turn on its center, a ratchet wheel therefor for driving it, a gravity lever in the vicinity of the dial-ratchet-wheel, a pawl depending from said lever to engage the said wheel, and an arm extending from the lever to rest upon the top of the arbor-ratchet-wheel to be raised by the teeth of the latter during its revolution, said lever falling from each tooth to impart a tenth of a revolution to the dial at each fall for the purposes described.

11. In a meter a series of continuously driven arbors, a ratchet wheel for each said arbor, a registering dial opposite the end of each arbor but independent thereof, said dial being mounted to turn at its center, a ratchet wheel therefor for driving it, a gravity lever in the vicinity of the dial-ratchet-wheel, a pawl depending from said lever to engage the said wheel, a second pawl for preventing the wheel moving in a backward direction, and an extension of the lever to rest upon the top of the arbor-ratchet-wheel to be raised by each tooth during passage of the teeth thereunder, said lever falling from each tooth to impart a partial revolution to the dial at each fall for the purposes indicated.

In testimony whereof I affix my signature, in presence of two witnesses.

DANIEL E. SCRAFFORD.

Witnesses:
 E. J. ABERSOL,
 L. M. THURLOW.